United States Patent [19]
Eidson

[11] Patent Number: 6,047,219
[45] Date of Patent: Apr. 4, 2000

[54] SPECIFICATION INTERPRETING DISTRIBUTED SYSTEM

[75] Inventor: John C. Eidson, Palo Alto, Calif.

[73] Assignee: Hewlett-Packard Company, Palo Alto, Calif.

[21] Appl. No.: 08/977,315

[22] Filed: Nov. 24, 1997

[51] Int. Cl.$^7$ .................................................. G05B 15/00
[52] U.S. Cl. .................................... 700/2; 700/28; 710/10
[58] Field of Search .................................. 700/2, 3, 7, 11, 700/9, 29, 28, 33, 34, 35, 90, 67, 83; 713/1, 100; 709/221; 710/10, 8

[56] References Cited

U.S. PATENT DOCUMENTS

| | | | |
|---|---|---|---|
| 5,056,001 | 10/1991 | Sexton | 710/10 |
| 5,083,288 | 1/1992 | Somlyody et al. | 700/67 X |
| 5,586,305 | 12/1996 | Eidson et al. | 700/3 X |
| 5,841,654 | 11/1998 | Verissimo et al. | 700/83 |
| 5,887,165 | 3/1999 | Martel et al. | 713/100 |

Primary Examiner—William Grant
Assistant Examiner—Steven R. Garland

[57] ABSTRACT

A specification interpreting distributed control system is disclosed which eliminates the need for application programs to distinguish among a wide variety of object models of adjustable transducer parameters. The specification interpreting distributed system enables an application program to configure transducers using specification messages that transport specifications for actions to be performed in the distributed control system in terms of attributes provided by the application program. The task of translating from the specification to particular object models is performed by mechanisms associated with each transducer.

25 Claims, 2 Drawing Sheets

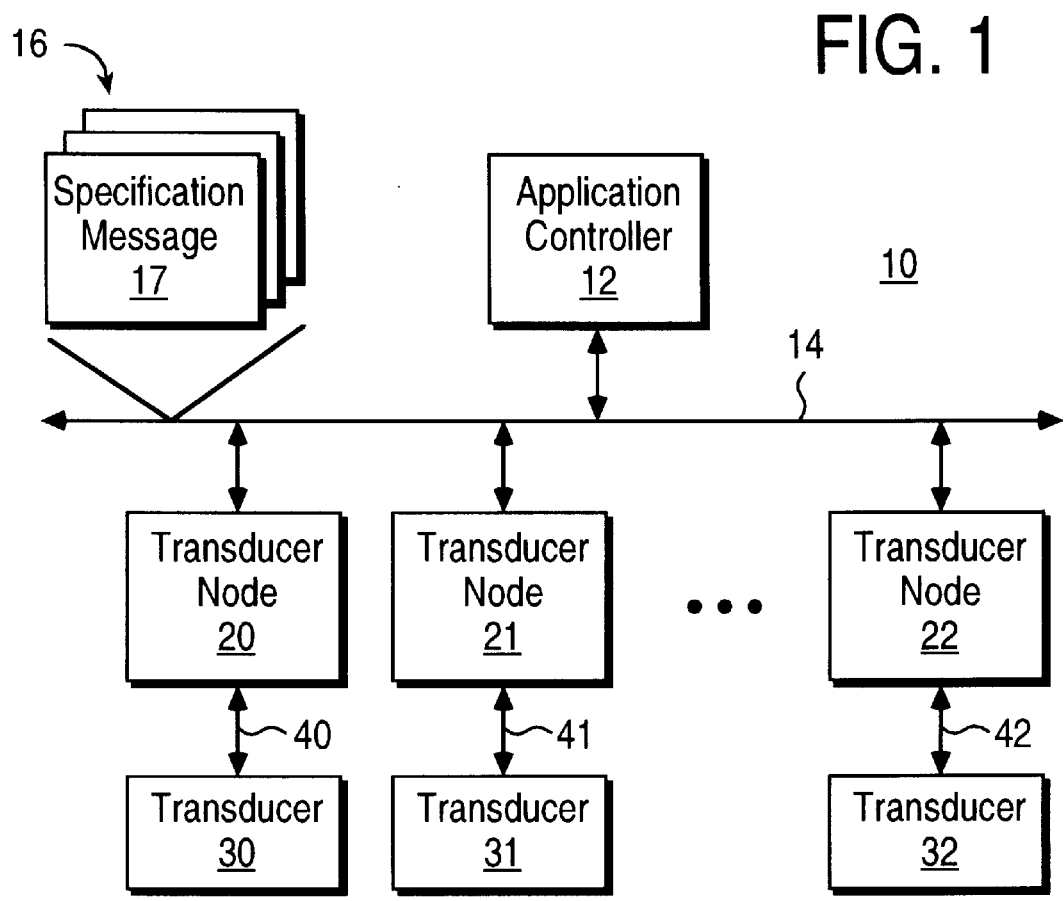

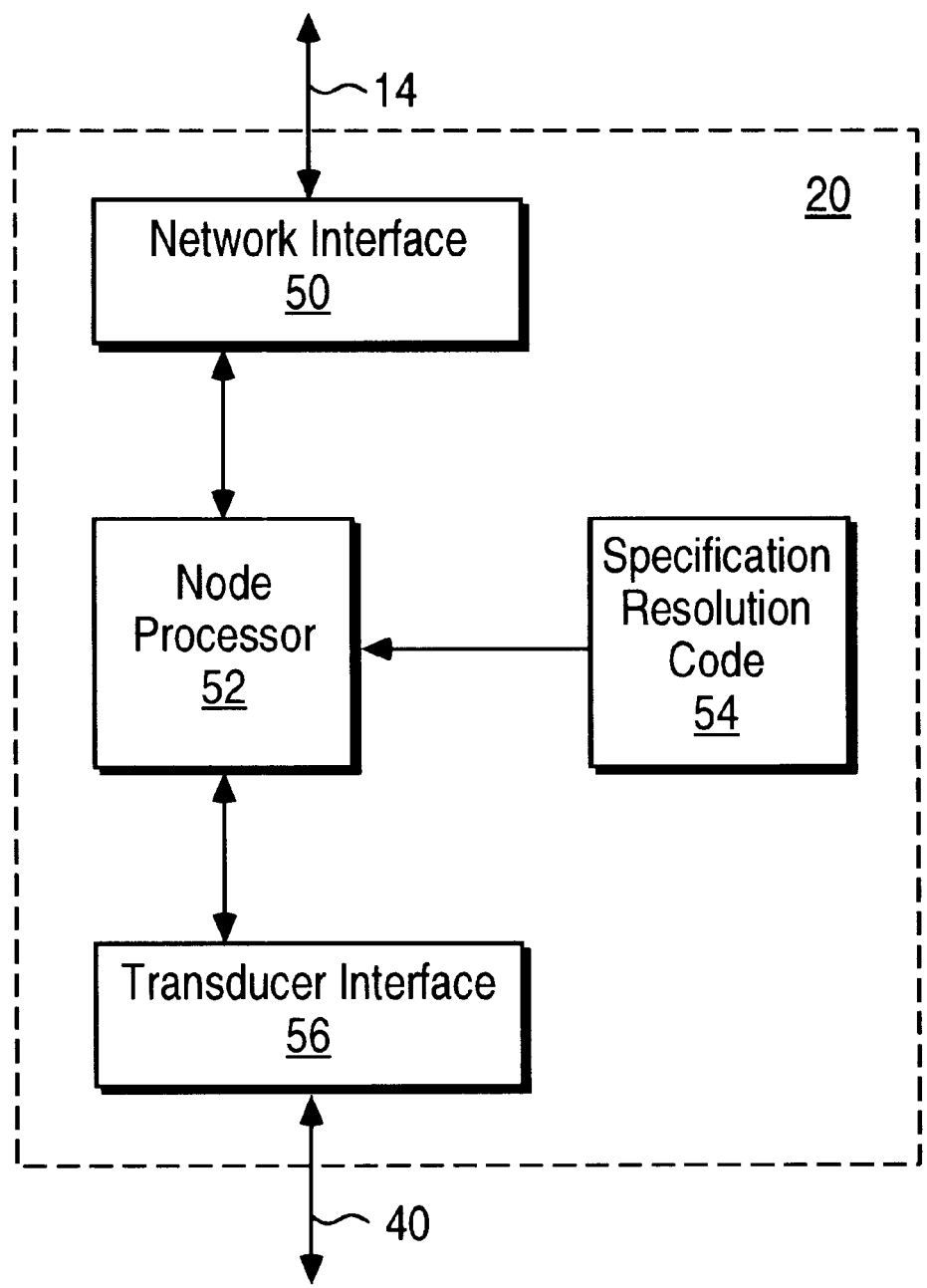

SPECIFICATION INTERPRETING DISTRIBUTED SYSTEM

BACKGROUND OF THE INVENTION

1. Field of Invention

The present invention pertains to the field of distributed systems. More particularly, this invention relates to a specification interpreting distributed system.

2. Art Background

A distributed control system commonly includes a set of transducers and application controllers which are arranged to provide control of industrial and other applications. Typically, the application controllers execute application programs for a distributed control system. The transducers and application controllers of a distributed control system may be interconnected via a communication network.

The transducers that may be employed in a distributed control system may include sensors such as temperature sensors, pressure sensors, tachometers, etc. The transducers that may be employed in a distributed control system may also include actuators such as valves, motors, heaters etc. Application controllers in a distributed control system may be implemented with programmable logic controllers (PLCs) or computer systems.

Prior transducers usually provide a set of adjustable parameters that are associated with their transducer function. The adjustable parameters for a transducer are typically represented in terms of an object model associated with the transducer. For example, a temperature sensor provided by a particular manufacturer may have an object model that includes an adjustable sampling period parameter. A temperature sensor from another manufacturer may provide an object model that includes an adjustable sampling frequency parameter. Both of these example adjustable parameters, sampling period and sampling frequency, control the rate at which a transducer performs a measurement. That rate, however, is represented differently in the object models of the transducers.

In a prior systems, an application program that controls a transducer usually obtains the object model for the transducer using, for example, messages exchanged via a communication network that connects to the transducer. The application program then typically determines the appropriate settings for the adjustable parameters in terms of the object model. The application program may access one or more transducer databases in order to obtain additional information necessary for a particular type of transducers. The application program then usually writes the selected settings for the adjustable parameters back to the transducer.

A given distributed control system commonly employs similar types of transducers from differing transducer manufacturers. In addition, similar types of transducers from differing manufacturers commonly have differing adjustable parameters as represented in their object models. Such differing adjustable parameters and object models for similar types of transducers usually requires that an application program have the capability of handling the object models of a wide variety of transducers.

Unfortunately, the inclusion of capabilities for handling multiple and diverse object models usually increases the time and cost required to develop application programs for a distributed control system. Moreover, new types of transducers added to such a prior system usually requires that existing application programs be modified to handle any new object models. This usually increases the cost of maintaining existing control systems and may limit the market for transducer manufacturers with respect to existing systems.

In addition, similar types of transducers from differing manufacturers commonly have differing constraints among their adjustable parameters. These differing constraints further complicates the task determining the appropriate settings for the adjustable parameters of differing transducers. Such complications usually increase the time and the cost of developing application programs in prior distributed systems. These differing parameter constraints also usually complicate the task of integrating new types of transducers into existing systems.

SUMMARY OF THE INVENTION

A specification interpreting distributed control system is disclosed which eliminates the need for application programs to distinguish among a wide variety of object models of adjustable transducer parameters. The specification interpreting distributed system enables an application program to configure transducers using messages that transport specifications for actions to be performed in the distributed control system in terms of attributes provided by the application program. The actions may be measurements by sensors or actuations applied by actuators.

The specifications contained in the messages are independent of any particular representation or object model for the adjustable parameters of the transducers that perform the actions. The task of translating from the specification to particular object models is performed by mechanisms associated with each transducer. In one embodiment, these mechanisms are implemented in transducer nodes that interface the transducers to a network in the system.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 1 illustrates one embodiment of a specification interpreting distributed control system which employs specification messages to configure transducers;

FIG. 2 illustrates mechanisms in a transducer node for receiving and interpreting the specification messages.

DETAILED DESCRIPTION

FIG. 1 illustrates one embodiment of a specification interpreting distributed control system 10. The distributed control system 10 includes an application controller 12 and a set of transducer nodes 20–22 which are coupled for communication via a network 14. The transducer nodes 20–22 interface a set of transducers 30–32 to the network 14.

The transducers 30–32 represent a variety of sensors suitable for a process control system including temperature sensors, pressure sensors, and tachometers, etc. The transducers 30–32 also represent a variety of actuators that may be employed in a process control system including actuators such as valves, motors, and heaters, etc. Each of the transducers 30–32 includes a set of adjustable transducer parameters.

The application controller 12 represents a centralized controller that may be employed in a process control system. The application controller 12 may be embodied as a computer system or a dedicated programmable logic controller (PLC) and may execute one or more application programs that make use of one or more of the transducers 30–32. In addition, one or more application programs may be executed on node processors which are contained in the transducer nodes 20–22.

The network 14 represents a packet-based communication network. The network 14 may be embodied as a general purpose network such as Ethernet or may be embodied as one or more of a variety of field level control buses adapted for the process control environment. These specialized fieldbuses include SDS buses, DeviceNet buses, LonTalk buses, Echelon buses, Foundation Fieldbuses, or Profibuses to name a few examples.

The application programs in the distributed control system 10 generate one or more specification messages 16. The specification messages 16 carry specifications for actions to be taken by the transducers 30–32. The actions taken by a particular transducer may be a measurement if it is a sensor or an actuation of it is an actuator or a combination if it is a combination sensor and actuator. The specification messages 16 are carried to the transducer nodes 20–22 via the network 14. The specification messages 16 may be broadcast to all of the transducer nodes 20–22 or may contain addressing fields to target specific ones of the transducer nodes 20–22.

One or more of the specification messages 16 may be generated by one or more application programs executing on the application controller 12. In addition, one or more of the specification messages 16 may be generated by one or more node application programs or portions of node application programs executing in one of the transducer nodes 20–22.

The specification in each specification message 16 is independent of the particular representations or object models of the adjustable parameters of the transducers 30–32. The specification in each specification message 16 is inherent in the process of measurement or actuation and in the definition of a measurement or actuation datum rather than in the nature of the transducer 30–32 that is rendering the measurement or performing the actuation. In one embodiment, the specification contained in each specification message 16 is arranged as a set of attributes which may include the following.

| Specification Attributes |
| --- |
| name |
| value |
| units |
| location |
| time-stamp |
| precision |
| accuracy |
| confidence interval |
| update interval |

One or more of the attributes shown above may be used to target the specification messages 16 for particular types of the transducers 30–32. For example, a name attribute of "temperature" in the specification message 17 may be used to target it for the transducer nodes 20–22 having a temperature sensor attached. Similarly, a name attribute of "voltage" may be used to target the transducer nodes having a voltage generator attached.

The units attribute of the specification messages 16 may be used to specify particular units for the transducers 30–32. For example, the units attribute in a specification message for a temperature sensor may specify degrees C or degrees F depending on the needs of the particular application. Similarly, the units attribute for a chemical actuator may specify units such as milliliters or grams.

The location attribute of the specification messages 16 may be used to target the transducers 30–32 having a particular physical location in the distributed control system 10. For example, a name attribute of "temperature" together with a location attribute providing physical coordinates may be used to target the specification message 17 to temperature sensors having a particular physical location in the distributed control system 10.

The time-stamp attribute of the specification messages 16 may be used to indicate whether measurements obtained by the transducer nodes 20–22 are to be time-stamped.

The precision attribute of the specification messages 16 may be used to specify the precision to which the transducers 30–32 are to render measurements or are to apply an actuation. The precision attribute may specify a number of bits such as 8 or 16 bit precision.

The accuracy attribute of the specification messages 16 may be used to specify the accuracy to which the targeted transducers 30–32 are to render measurements or are to apply an actuation. The accuracy attribute may specify a percentage value such as 5 or 10 percent accuracy.

The confidence interval attribute of the specification messages 16 may be used to specify a statistical confidence interval for measurements rendered by the transducers 30–32 or for actuations applied by the transducers 30–32. The confidence interval attribute may specify a percentage confidence interval such as greater than 50 percent confidence.

The update interval attribute of the specification messages 16 may be used to specify a rate at which measurements are to be obtained by the transducers 30–32 or the rate at which actuations are to be applied by the transducers 30–32. The update interval attribute may specify a time interval such as 1 second or 10 seconds.

The specification attributes in the specification messages may also include one or more default settings for parameters associated with actuators. The default setting may be used by the transducers 30–32 that are actuators during emergency conditions in the distributed control system 10 or when communication is lost on the network 14. For example, the specification attributes may include a default actuator update rate or set point value.

The transducer nodes 20–22 act upon the appropriate ones of the specification messages 16 according to the type of attached transducer 30–32. For example, the transducer nodes 20–22 having a temperature sensor attached act upon the specification messages 16 having a name attribute of "transducer" while the transducer nodes 20–22 having a pressure sensor attached act upon the specification messages 16 that have a "pressure" name attribute, etc.

In one embodiment, the transducer nodes 20–22 generate acknowledgment messages in response to the specification messages 16. An acknowledgment message may indicate whether the originating transducer node 20–22 was able to successfully interpret and set up the corresponding transducer 30–32 to conform to the specification in the corresponding specification message 16.

Alternatively, an acknowledgment message may contain a specification actually achieved by the originating transducer node 20–22. In this embodiment, the specification actually achieved is indicated in an acknowledgment message using the same format as the specification in the specification messages 16 as set forth above.

FIG. 2 illustrates mechanisms in the transducer node 20 for receiving and interpreting the specification messages 16 and setting the adjustable transducer parameters for the transducer 30 and returning acknowledgment messages. These mechanisms in transducer node 20 includes a network interface 50, a transducer interface 56, a node processor 52 and specification resolution code 54. The transducer nodes 21–22 may be substantially similar with respect to the mechanisms for receiving and interpreting the specification messages 16 and setting the adjustable transducer parameters in attached sensors and returning acknowledgment messages.

The network interface 50 represents a combination of hardware and software that enables communication via the network 14 including reception of the specification messages 16 and transmission of acknowledgment messages. The network interface 50 is adapted to the physical interface and the protocols of the particular type of the network 14 and may be an Ethernet interface or an interface for a specialized field-bus as is appropriate.

The node processor 52 obtains, for example, the specification message 17 from the network interface 50 and executes the specification resolution code 54 to interpret or translate the attributes contained therein into a set of adjustable transducer parameters associated with the transducer 30. The specification resolution code 54 may be contained in a persistent memory in the transducer node 20. Alternatively, the specification resolution code 54 may be stored in the transducers 30 and transferred into a memory in the transducer node 20 at power up or initialization.

The node processor 52 when executing the specification resolution code 54 may translate one or more of the attributes of the specification message 17 directly into a corresponding adjustable transducer attribute.

For example, the object model of the transducer 30 may include an adjustable transducer parameter that sets its sampling frequency for rendering measurements. The node processor 52 when executing the specification resolution code 54 obtains the update interval attribute from the specification message 17 and converts it to a sampling frequency for use by the transducer 30.

In another example, the node processor 52 when executing the specification resolution code 54 may obtain a units attribute from the specification message 17 that specifies degrees F. In response, the node processor 52 may set an adjustable parameter for the transducer 30 that control units accordingly. The node processor 52 may alternatively convert the units of temperature measurements obtained by the transducer 30 into degrees F for measurements subsequently obtained by the transducer 30. In another example, if the transducer 30 is a heater then node processor 52 may convert the units of temperature contained in the specification message 17 into units required by the transducer 30.

This translation function as illustrated by the above examples allows to the originating node of the specification message 17 to set adjustable parameters for a wide variety of transducers that may represent equivalent adjustable parameters in a variety of ways. The uniform format of the specification message 17 shields the originating node, such as the application controller 12 from having to adapt to the particular object models or representations which the transducer 30–32 use for the adjustable transducer parameters. In addition, this translation function allows equivalent transducers that represent adjustable transducer parameters in differing ways to be freely substituted for the transducer 30 without burdening the application programs in the distributed control system 10 with these differences. These differences are instead handled by the node processor 20 with its specification resolution code 54.

As another example, the node processor 52 when executing the specification resolution code 54 may adjust the signal conditioning bandwidth of filter circuitry in the transducer 30 or may set parameters that cause the transducer 30 to obtain multiple samples and average the samples to meet the specifications contained in the specification message 17. In addition, the node processor 52 may adjust the open/close rate for a valve actuator or select differing dispensing mechanisms in a chemical actuator in order to meet the specification carried by the specification message 17.

The node processor 52 when executing the specification resolution code 54 may make use of a set of configuration information associated with the transducer 30. The configuration information may indicate any constraints among the adjustable parameters of the transducer 30.

For example, the configuration information for the transducer 30 may include data that indicates a relationship between measurement accuracy and measurement confidence interval for the transducer 30. This relationship may be represented as graph data which relates accuracy to confidence interval for a set of differing sampling rates or update intervals. The node processor 52 when executing the specification resolution code 54 compares the accuracy attribute and the confidence interval attribute from the specification message 17 to the configuration information from the transducer 30. This enables a determination of whether the accuracy and confidence interval adjustable transducer parameters for the transducer 30 can be set to meet the accuracy and confidence interval attributes of the specification message 17. The node processor 52 when executing the specification resolution code 54 may trade-off the accuracy and confidence interval adjustable parameters or the sample rate adjustable parameter of the transducer 30 or any combination of these in order to meet the specification in the specification message 17.

In one embodiment, the configuration information for the transducer 30 is contained in the transducer node 20. The configuration information may be part of the specification resolution code 54 or may be contained in a separate persistent memory (not shown) in the transducer node 20.

In an alternative embodiment, the configuration information for the transducer 30 is contained in the transducer 30 in, for example, a persistent memory. The node processor 52 reads the configuration information from the transducer 30 via the transducer interface 56 when executing the specification resolution code 54 or at power up or initialization time.

The transducer node 20 and the transducer 30 may be connected using a device-oriented standard interface such as the IEEE 1451.2 standard. The IEEE 1451.2 standard specifies multiple channels for obtaining device variables and defines a format of information pertaining to each attached device. The information pertaining to a particular attached device describes the type of device, the data rate, units of measure and special triggering requirements, etc. The node processor 52 in such an embodiment uses the IEEE 1451.2 interface standard embodied in the transducer interface 56 to obtain the configuration information from the transducer 30 for use when executing the specification resolution code 54.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A distributed control system, comprising:

means for transferring a message via a network, the message containing a specification for an action to be performed by a transducer in the distributed control system such that the specification is independent of an object model of the transducer which is used to represent of a set of adjustable parameters used by the transducer when performing the action;

means for interfacing the transducer to the network including means for determining settings for the adjustable parameters in terms of the object model of the transducer in response to the specification contained in the message.

2. The distributed control system of claim 1, wherein the action is a measurement by the transducer.

3. The distributed control system of claim 1, wherein the action is an actuation by the transducer.

4. The distributed control system of claim 1, wherein the means for determining settings comprises means for translating one or more attributes of the specification into the adjustable parameters.

5. The distributed control system of claim 1, wherein the means for determining settings comprises:

means for obtaining configuration information for the transducer;

means for translating one or more attributes of the specification into the adjustable parameters in response to the configuration information.

6. The distributed control system of claim 5, wherein the configuration information indicates one or more constraints among the adjustable parameters.

7. The distributed control system of claim 5, wherein the configuration information is stored in the transducer.

8. The distributed control system of claim 1, wherein the specification includes a specification of a precision of measurement.

9. The distributed control system of claim 1, wherein the specification includes a specification of an accuracy of the action.

10. The distributed control system of claim 1, wherein the specification includes a specification of a confidence interval for the action.

11. The distributed control system of claim 1, wherein the specification includes a specification of an update interval for the action.

12. The distributed control system of claim 1, wherein the adjustable parameters include a bandwidth for filter circuitry in the transducer.

13. A distributed control system, comprising:

network that carries a message containing a specification for an action to be performed by a transducer in the distributed control system such that the specification is independent of an object model of the transducer which is used to represent of a set of adjustable parameters used by the transducer when performing the action;

transducer node coupled to the transducer and the network, the transducer node including a node processor and specification resolution code for determining settings for the adjustable parameters in terms of the object model of the transducer in response to the specification contained in the message.

14. The distributed control system of claim 13, wherein the action is a measurement by the transducer.

15. The distributed control system of claim 13, wherein the action is an actuation by the transducer.

16. The distributed control system of claim 13, wherein the node processor when executing the specification resolution code determines settings by translating one or more attributes of the specification into the adjustable parameters.

17. The distributed control system of claim 13, wherein the specification resolution code includes configuration information for the transducer that indicates one or more constraints among the adjustable parameters.

18. The distributed control system of claim 13, wherein the node processor when executing the specification resolution code obtains configuration information from the transducer that indicates one or more constraints among the adjustable parameters.

19. A method for specifying an action to be taken by a transducer in a distributed control system, comprising the steps of:

transferring a message via a network, the message containing a specification for the action to be performed by the transducer such that the specification is independent of an object model of the transducer which is used to represent of a set of adjustable parameters used by the transducer when performing the action;

receiving the message over the network and determining settings for the adjustable parameters in terms of the object model of the transducer in response to the specification contained in the message.

20. The method of claim 19, wherein the action is a measurement by the transducer.

21. The method of claim 19, wherein the action is an actuation by the transducer.

22. The method of claim 19, wherein the step of determining settings includes the step of translating one or more attributes of the specification into the adjustable parameters.

23. The method of claim 19, wherein the step of determining settings comprises the steps of:

obtaining a set of configuration information for the transducer;

translating one or more attributes of the specification into the adjustable parameters in response to the configuration information.

24. The method of claim 23, wherein the configuration information indicates one or more constraints among the adjustable parameters.

25. The method of claim 23, wherein the step of obtaining a set of configuration information comprises the step of obtaining the configuration information from the transducer.

* * * * *